United States Patent

Wallace et al.

[11] 4,040,665
[45] Aug. 9, 1977

[54] ARM REST ASSEMBLY FOR SEATING STRUCTURES

[75] Inventors: Earl C. Wallace; Richard A. Bell, both of Andrews, Ind.

[73] Assignee: General Engineering & Mfg. Corporation, Andrews, Ind.

[21] Appl. No.: 666,181

[22] Filed: Mar. 12, 1976

[51] Int. Cl.$^2$ .............................................. A47C 7/54
[52] U.S. Cl. .................................... 297/417; 297/416
[58] Field of Search ....................... 297/113, 416, 417

[56] References Cited

U.S. PATENT DOCUMENTS

| 2,269,918 | 1/1942 | Sill ........................................ 297/417 |
| 3,807,799 | 4/1974 | Freedman ............................ 297/417 |

Primary Examiner—James C. Mitchell
Attorney, Agent, or Firm—David H. Wilson

[57] ABSTRACT

An arm rest assembly for seating structures pivotally mounted on the upstanding sides of the back support for a seat and arranged for movement in an arc generally normal to the back from a retracted position in which its arm supporting surface is generally parallel to the back and extends toward the seat to a position in which the surface is generally perpendicular to the back and to a position in which the surface defines an acute angle with the back. A detent in the form of cooperating abutments on the pivotal elements providing the arcuate motion and resilient biasing means tending to displace the elements axially of each other enables the arm supporting surface to be latched in the perpendicular relation. In the parallel relation the arm rest element tends to conform to the seat back since it has a stiffening web depending from the arm supporting surface along its length on the side outward from the region occupied by a seat occupant to effectively wrap around the front and side portions of the seat back. The detent abutments constrain relative axial motion of the arm rest element outward from the seat side except when the acute angle relationship is established to register an abutment on one pivotal element with a release notch or keyway on the other pivotal element. When so registered, the arm rest can be removed from the seat back by sliding it outward along the pivot axis to separate the pivotal elements.

5 Claims, 5 Drawing Figures

ARM REST ASSEMBLY FOR SEATING STRUCTURES

BACKGROUND OF THE INVENTION

1. Field of the Invention

The present invention relates to seating structures, and more particularly to arm rests which are movable with respect to the seating structures.

2. Description of the Prior Art

In the past, seating structures have been provided with arm rests that are movable between several positions relative to the back support portion of the structure. In some, the arm rest is pivotally movable between a generally horizontal position in which it extends from the back above on the side of the seat and retracted position, in which it is flush with the back. Typically, such arrangements have been designed to be used in a vehicle. Such structures generally have complicated linkages mounted in the arm rest and/or back, and require the back of the seat structure to have sufficient depth to provide clearance for the range of motion of the elements of the arm rest frame and a pocket to received the arm rest. Other structures permit pivotal movement through use of less complicated linkages, but fail either to provide any locking means in the various vertical positions or to allow the arm rest frame to be totally removed from the seating structure.

SUMMARY OF THE INVENTION

The instant invention contemplates an arm rest that contains an uncomplicated and inexpensively manufactured linkage that permits movement between a retracted position, an arm support station and a release station about the arm rest bracket mounted on the side of a seat.

The arm rest is of a cross section to conform generally to the back cushion of a seating structure when its operative upper face is positioned generally parallel to that cushion whereby the arm rest in its lowered or stored position blends into the back cushion in an inconspicuous manner. A pivotal mounting with detent means enables the arm rest to be fixed in an arm supporting position. A release station is provided at a position of rotation around the pivotal mounting above and beyond the normal arm support position such that the arm rest can be removed with only an inconspicuous socket aperture exposed on the back of the seating structure.

An object of the invention is to simply and reduce the expense of arm rest constructions.

A second object is to reduce the volume of space occupied by an arm rest in its stored condition.

An additional object of the invention is to facilitate separation and removal of the arm rest from the seat structure with which it is associated.

Yet another object of the invention is to permit the arm rest to be used in a seat structure that has very little depth, and thus be used in applications where the size of the seat structure and arm rest are important design considerations.

DESCRIPTION OF THE PREFERRED EMBODIMENT

Figure 1:
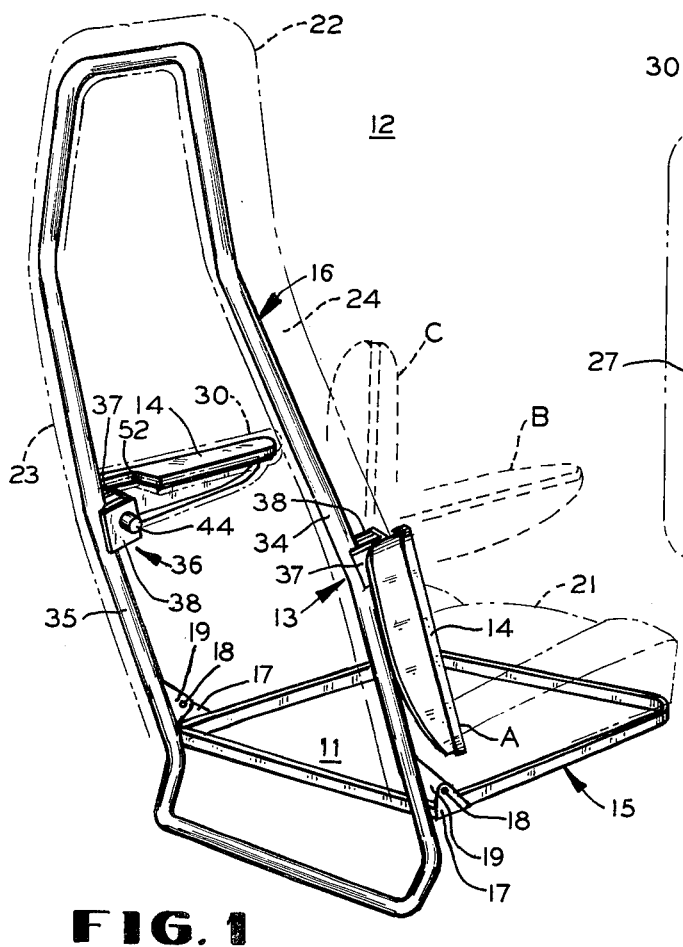
FIG. 1 is a perspective view of a skeletonized seat frame and back frame of a typical seating structure of the type to which the arm rest of this invention is applicable showing one arm rest body structure and its mounting in arm supporting position, a second arm rest in its stored position with its arm supporting and release positions shown in phantom, and with the cushioning and upholstery for the seat, back support and one arm rest represented in phantom.

A frame 11 of a chair 12 such as might be mounted on a pedestal (not shown) in a vehicle (not shown) is shown in FIG. 1 with a mount 13 for an arm rest 14 according to this invention. The frame 11 is composed of two major components, each formed of tubing to receive supporting spring elements (not shown) which are covered with upholstered cushions shown in phantom. A seat base frame 15 is of generally rectangular form. A back rest frame 16 is mounted on the seat frame 15 by seat brackets 17 apertured to receive pivot pins 18 also passing through back frame brackets 19. Brackets 17 and 19 are suitably secured to their respective frame components 15 and 16 as by welding. A latching mechanism (not shown) affords means for establishing one or more fixed positions of the back frame 16 relative to the seat frame wherein the back of the seating structure is upstanding generally, as illustrated in FIG. 1.

Seat cushioning 21 and back cushioning 22 have their major portions on the upper side of the seat frame 15 and seat side of the back frame 16 respectively. A backing 23 of relatively thin construction encloses the back of back frame 16 to finish the seat.

In practice it is frequently desirable to provide a seating structure such as generally described above with arm rests 14 which can be shifted between a retracted position, station A on FIG. 1, and an arm support position, station B in FIG. 1. Further, where two or more seating structures are placed closely adjacent each other, it is advantageous to be able to remove the arm rest temporarily and yet provide for its convenient remounting on the seating structure. This is provided by outboard motion of the arm rest from station C, as will be more fully discussed.

Figure 3:
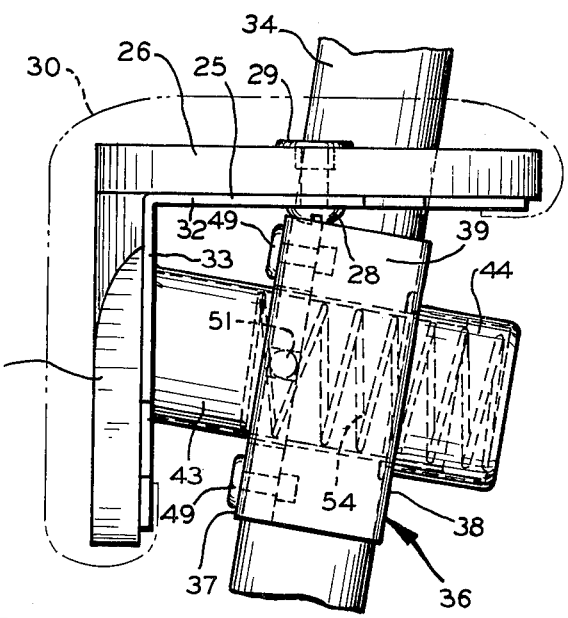
FIG. 3 is an end view of the arm rest, mount and back rest fragment of FIG. 2 with the cushioning material on the arm rest shown in phantom.
Figure 2:
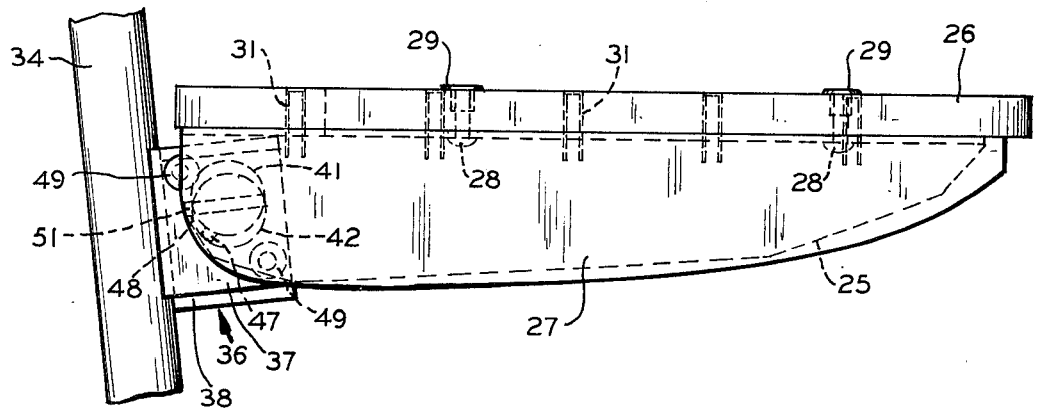
FIG. 2 is a side elevation of an arm rest base structure according to this invention together with the pivotal mount therefor and a fragment of the frame of a back rest to which portions of the mount are secured.
Figure 4:
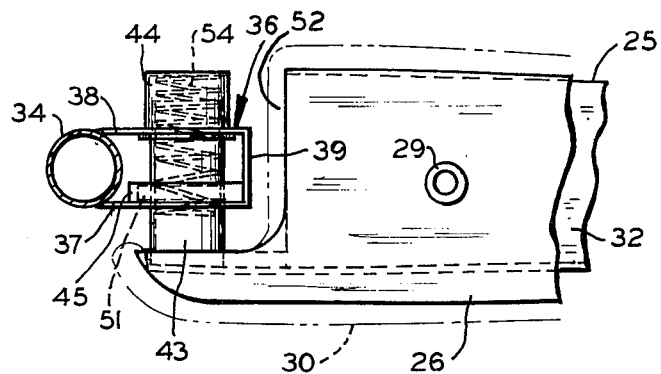
FIG. 4 is a top view of a fragment of the arm rest and back rest and of the pivotal mount between those elements as shown in FIGS. 2 and 3 with the cushioning material on the arm rest shown in phantom.
Figure 5:
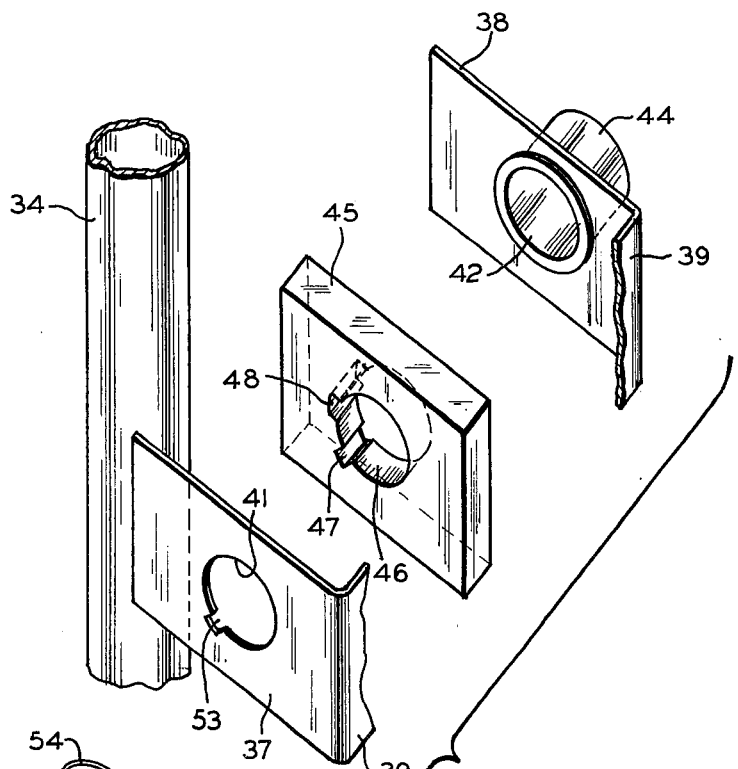
FIG. 5 is an exploded perspective of the arm rest pivotal mounting and fragments of the seat back support frame.
Figure 5:
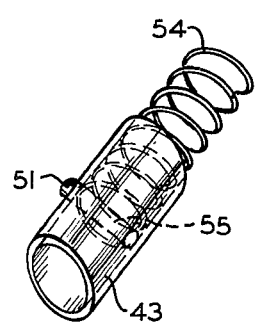

The arm rest 14 of the present invention is arranged to blend into the contour of the cushion when in its retracted position, station A. It is formed with an under body which conforms generally to the back cushion 22 face (not shown) and side 24 and to wrap around that face and side as an L shaped cross section or angle base 25 of metal. An upper facing 26 and outer side facing 27 are mounted on the base 25 as by means of machine screws 28 engaging sheet metal nuts 29 secured in suitable apertures in upper facing 26. The side facing 27 is secured to the upper facing 26 as by staples 31 and an adhesive bond at their interface. Advantageously, the facing members are contoured to give a suitable form to the padding and upholstery 30 (not shown) in FIG. 3 applied thereto whereby a relatively thin arm rest which is hollow on its inner side and under face presents the appearance of a boxed structure from its upper and outer side faces.

The resultant arm rest 14 can be considered to have a base 25 made up of an arm supporting surface 32 having a stiffening web 33 depending from its underside adjacent the margin of surface 32 outboard of the seat 15 and extending along its length. The angle subtended by the surface 32 and web 33 defines a cavity which conforms generally to the back cushion 22 along the sides of its occupant engaging face and sides 24 in a wrap around fashion, as represented at station A of FIG. 1.

Mounts 13 include brackets on the side rails or tubes 34 and 35 of back frame 16 which are in the form of a channel or box member 36 having side panels 37 and 38 and a joining web 39 welded to the rails 34 and 35 to extend toward the front face of the back cushion 22.

Aligned circular apertures 41 and 42 are provided in the outer and inner faces 37 and 38 of the members 36 to accommodate a pivot tube 43 secured to the arm rest base 25. A cup 44 of circular cross section and having an inner diameter accommodating and receiving the outer diameter of pivot tube 43 is secured in registry with inner face aperture 42 whereby pivot tube 43 is journaled for pivotal motion about its longitudinal axis and the coincident centers of aperture 41 and the cross section of cup 44.

A cam plate 45 having a circular aperture 46 and two or more notches 47 and 48 is secured to the inner surface of the outer face 37 of channel 36 as by rivets 49. This aperture 46 affords an additional pivotal bearing surface for pivot tube 43 and the sidewalls of the notches 47 and 48 provide abutments which enter into detenting and latching functions for the arm rest 14. A stub 51 extends radially from pivot tube 43 and is adapted to fit into and to cooperate with notches 47 and 48 in establishing the several spatial and positional relationships between the arm rest 14 and back frame 16.

In latching the arm rest in its arm supporting position the abutment of stub 51 is engaged with the abutments of the walls of notch 48 by rotating the arm to station B and permitting the pivot tube 43 to be displaced outboard of the back the thickness of cam plate 45 as stub 51 enters notch 48 and seats in that notch against the inner face of outer side panel 37. In releasing the arm rest for rotation from station B, pivot tube 43 is displaced inward toward back support frame 16 the diameter of stub 51 to free the stub of notch 48. While the tube 43 is so displaced, it and arm rest 14 can be rotated about the pivot axis of the pivotal coupling through an arc limited by the interference of the arm rest 14 with the back support cushion 22. This range of motion is enhanced for pivotal motion as to station C by a cutout 52 in arm supporting surface 32 so that it accommodates the back cushion with little or no compression thereof as the arm is raised.

Notch 47 registers with a notch 53 in the circular perimeter of aperture 41 in outer side 37 which is oriented circumferentially to register with the stub 51 when the arm rest 14 is in its release position, station C in FIG. 1. In the example, the stub 51 extends radially so that its radial projection from pivot tube 43 is generally parallel to the plane of the top side of arm rest base 25. Thus the release notches 47 and 53 lie along radii of their respective circular apertures which intersect with the plane defined by longitudinal axes of side rails 34 and 35 in the region to which mounts 13 are secured at an acute angle while the latch notches 48 lie along radii which are generally normal to that plane.

In order to retain the arm rests latched in the arm supporting position, the pivotal elements are resiliently biased along the pivot axis by a spring 54 which is in compression and tends to force the pivot tube 43 from cup 44 and mount 13. The latch notches 48 have overlying walls of the outer side panels 37 of mounts 13 which constrain the stubs 51 in a detenting condition and against the biasing force of spring 54 when the arm rests 14 are in their arm supporting position, station B of FIG. 1. In addition to biasing the pivotal elements into positions in which their detenting abutments engage, the biasing springs also function as drag brakes retarding the free rotation of the arm rests by the frictional engagement with the closed ends of the cups 44 in which they are seated.

Removal of arm rest 14 is facilitated by the relieved region 52 in the upper surface 32 of base 25 and upper facing 26 above pivotal tube 43. Relieved region 52 permits the arm rest to be pivoted upward without interference between side rail 34 or 35, as the case may be, and the upper facing 26 or underlying upper surface of base 25. In addition, the degree of relief of region 52 is sufficient to accommodate that portion of the padding and upholstery 30 on the upper facing 26 and finishing the edge of the relieved region 52 of the arm rest 14 as well as the back cushioning 22 while the arm rest 14 is raised to its release position.

Stubs 51 provide retainers for bias springs 54 by extending between turns of the spring coil across the inner diameter of pivot tube 43 as cross bars 55.

A finished seating structure can have its upholstery finished around the apertures receiving pivot tube 43 as by a binding, a button-hole type of stiching, or a suitable metal or plastic grommet (none of which are shown).

Where a wide range of reclining positions are afforded by the back-to-seat position, latch mechanism provided several latch notches 48, can be provided in cam plate 45 to provide several latch stations at varying attitudes to seat back frame 16, generally at an angular relationship to the back frame tending to bisect the reclining angle between the back frame and the seat. Where a fully reclining back frame position is available, it may be desirable from a comfort standpoint to remove the arm rests 14. Of course, arm rest removal is possible even in the reclined position provided sufficient space is available for withdrawal of the arm rest assembly and pivot tube 39 outboard of the side of the seat back.

Variations in the arm rest mount and geometry are contemplated. For example, the pivotal means can be transposed to locate the pivot tube on the back support frame and its journal in the arm rest. Different detenting and/or releasing structures can be substituted as interacting abutments for the stub and latch plate. Accordingly, the above detailed disclosure is to be read as illustrative of the invention and not in a limiting sense.

What is claimed is:

1. An arm rest assembly for a seating structure having a seat and a back secured to said seat comprising a rigid, elongate arm rest element having an arm supporting surface and adapted to be supported on said back to extend said arm supporting surface generally normal to said back; a first pivotal element mounted on said arm rest element; a second pivotal element mounted on said back and adapted to cooperate with said first pivotal element in establishing an arc of motion of said arm rest element in planes generally normal to the general plane of said back and extending between a first position in which said arm supporting surface is generally parallel to said seat back and intermediate said second pivotal element and said seat and a second position in which said arm supporting surface subtends an acute angle with said back; detenting means on said first and second pivotal elements cooperating to latch said arm rest element against pivotal motion at a third position in the arc of its motion intermediate said first and second positions; said first and second pivotal elements being a cylinder and a journal for said cylinder; said detent means including a first abutment mounted on said cylinder and an abutment on said journal and selectively engageable with said first abutment; and biasing means tending to displace said cylinder and said journal relatively axially to engage said first and second abutments; wherein said cyclinder is hollow and said journal includes a cup adapted to receive the end of said cylinder, wherein said abutment on said cylinder is a bar extending diametrically across a section of said cylinder, and wherein said biasing means is a coiled compression spring fitted within said cylinder with adjacent turns thereof gripping said bar and with an end thereof extending beyond said cylinder for compressive engagement with the interior of said cup.

2. An arm rest assembly according to claim 1 wherein said detent means includes a first abutment protruding radially from said cylinder and a second abutment mounted on said journal and selectively engageable with said first abutment to inhibit pivotal motion of said arm rest element; means engageable with said first abutment for inhibiting relative axial motion between said cylinder and said journal over an arc extending from said first to said third positions and releasable from said first abutment when said cylinder and said journal are in said second position whereby cylinder can be withdrawn from said journal to release said arm rest element from said seating structure.

3. An arm rest assembly for a seating structure having a seat and a back secured to said seat, said back having a face for engagement by an occupant of the seating structure and sides extending generally normal to said face and rearwardly of said seat, comprising a rigid, elongate arm rest element having an arm supporting surface and adapted to be supported on said back to extend said arm supporting surface generally normal to said back; a first pivotal element mounted on said arm rest element; a second pivotal element mounted on said back and adapted to cooperate with said first pivotal element in establishing an arc of motion of said arm rest element in planes generally normal to the general plane of said back and extending between a first position in which said arm supporting surface is generally parallel to said seat back and intermediate said second pivotal element and said seat and a second position in which said arm supporting surface subtends an acute angle with said seat back; detenting means on said first and second pivotal elements cooperating to latch said arm rest element against pivotal motion at a third position in the arc of it motion intermediate said first and second positions; and a stiffening web depending from the underside of the arm supporting surface adjacent the margin of said surface outboard of said seat and extending along the length of said arm element, said arm rest element defining a cavity between said arm supporting surface and said stiffening web adapted to conform to and enclose a portion of the face and a side of said back when said arm rest element is pivoted to said first position.

4. An arm rest assembly for a seating structure having a seat and a back secured to said seat comprising a rigid, elongate arm rest element having an arm supporting surface and adapted to be supported on said back to extend said arm supporting surface generally normal to said back; a first pivotal element mounted on said arm rest element; a second pivotal element mounted on said back and adapted to cooperate with first pivotal element in establishing an arc of motion of said arm rest element in planes generally normal to the general plane of said back and extending between a first position in which said arm supporting surface is generally parallel to said seat back and intermediate said second pivotal element and said seat and a second position in which said arm supporting surface subtends an acute angle with said seat back; detenting means on said first and second pivotal elements cooperating to latch said arm rest element against pivotal motion at a third position in the arc of its motion intermediate said first and second positions; and a cushion on said back having a thickness encompassing said second pivotal element; and wherein said arm supporting surface of said arm rest element has a width extending over a portion of said seat and a region which is cut away proximate said first pivotal element which is outboard of said seat to accommodate said back cushion while said arm element is pivoted to and approaching said second position.

5. An arm rest assembly according to claim 1 wherein said back has a face for engagement by an occupant of the seating structure and sides which converge upwardly of said seat and extend generally normal to said face and rearwardly of said seat, said journal cup being mounted on a converging side of said back withits longitudinal axis of rotation generally normal to said side whereby said arm pivots around an axis inclined to the horizontal.

* * * * *